March 17, 1931.  A. SPILLMAN  1,796,901
FLEXIBLE JOINT
Filed Jan. 15, 1930
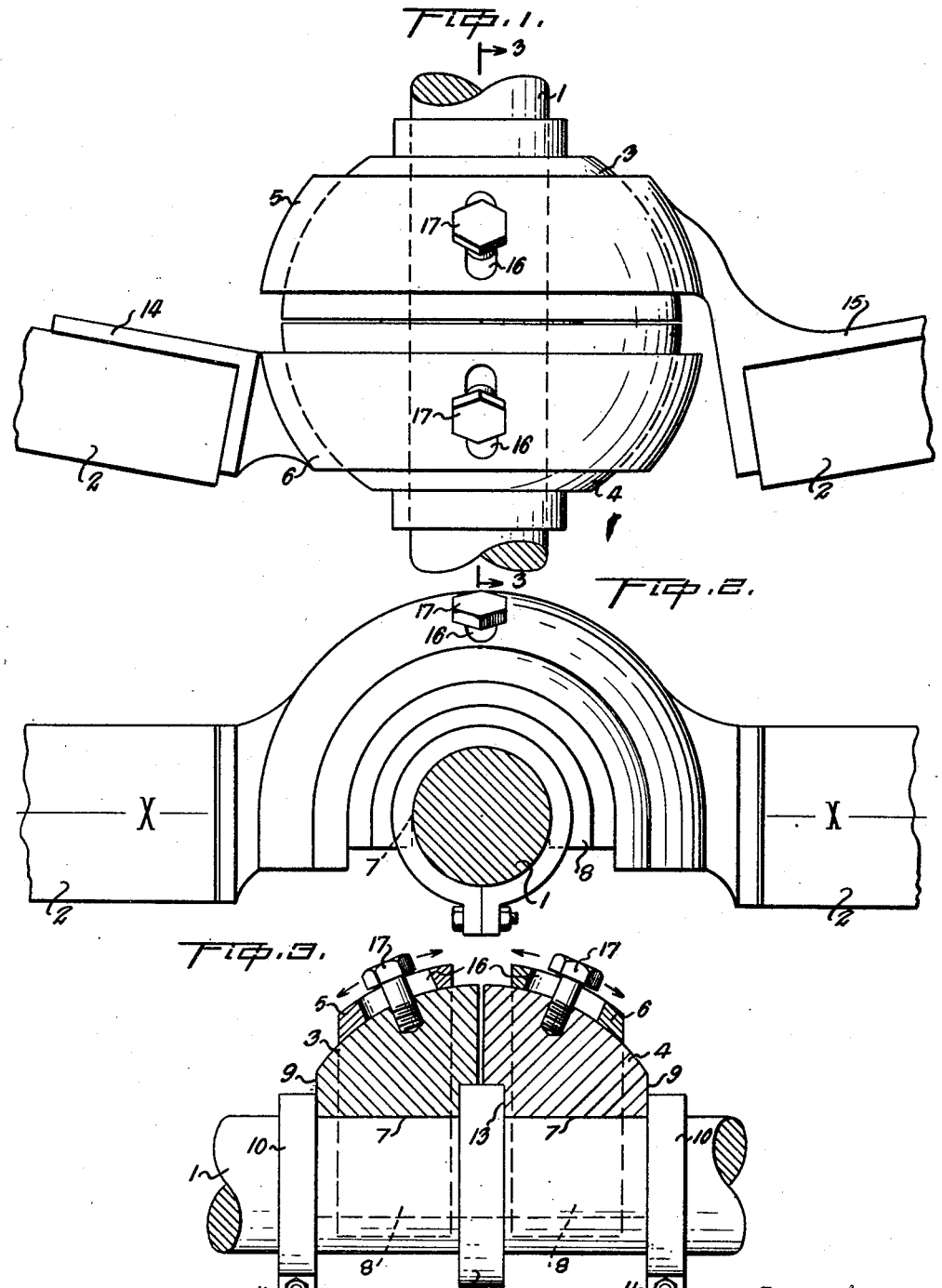
Inventor-
Albert Spillman Patented Mar. 17, 1931

1,796,901

UNITED STATES PATENT OFFICE

ALBERT SPILLMAN, OF NORTH TONAWANDA, NEW YORK

FLEXIBLE JOINT

Application filed January 15, 1930. Serial No. 421,037.

My invention relates to improvements in flexible joints and is particularly designed for use in rotary undulating amusement devices of the general type illustrated in United States Patent No. 1,501,613, July 15th, 1924, and British Patent No. 232,876, April 30th, 1925. In devices of this type a plurality of sweeps or arms radiate from a central hub to which they are pivotally connected, and are at their outer ends, provided with inter-connecting links and wheels which run upon an undulated concentric circular track.

The inter-connecting links which form a peripheral rim to the sweep structure are necessarily swingably connected to the ends of the sweeps as the sweeps have individual vertical swinging movements as the sweep structure rotates. These inter-connecting links in turn form part of the supporting means for the various passenger carrying devices that have been incorporated in this type of rotary structure and as adjacent link connected sweeps are very seldom at the same angle as the structure is rotating, the inter-connecting links as well as swinging with respect to the sweeps have a certain twisting motion.

Heretofore this twisting motion was taken care of by making the pivotal connections between the inter-connecting links and sweeps loose, but this was a rather haphazard construction as the structure was slack and noisy and therefore subject to many unnecessary stresses and strains.

The object of the present invention is to provide a flexible joint forming a connection between the inter-connecting links and the sweeps, such connection permitting a twisting movement of the inter-connecting links as well as the usual swinging movement.

A further object of the invention is to provide a flexible joint in which friction is reduced to a minimum and which is also of simple construction permitting the structure to be readily taken apart and assembled.

My invention consists of a flexible joint structure constructed and arranged all as hereinafter more particularly described and illustrated in the accompanying drawing in which:

Figure 1 is a plan view of my joint showing it forming a connection between a fragmentary portion of a radiating sweep and fragmentary portions of two inter-connecting links.

Figure 2 is a vertical cross sectional view through the sweep showing a front elevation of my joint, and Figure 3 is a vertical cross sectional view through the line 3—3, Figure 1.

Like characters of reference indicate corresponding parts in the different views in the drawing.

1 is a fragmentary portion of a sweep belonging to the type of device hereinbefore mentioned, such sweep being circular cross section and 2 are the ends of inter-connecting links which of course extend between adjacent pairs of sweeps.

My joint consists of four main members 3, 4, 5 and 6, the members 3 and 4 forming a semi-spherical male knuckle portion swingably mounted upon the sweep 1. These members 3 and 4 are formed with bottom grooves 7 of semi-circular cross section of the same diameter as the diameter of the sweep 1 so that the grooves fit the sweep, the lower parts 8 of the members 3 and 4 extend downwardly below the horizontal centre line through the sweep thus eliminating the possibility of such male knuckle portion becoming disengaged therefrom.

Surrounding the sweep 1 in the vicinity of the flat end faces 9 of the members 3 and 4, I furnish bifurcated collars 10 which are retained in close gripping relation with the sweep by bolts 11. Also surrounding the sweep and positioned substantially between the members 3 and 4 I furnish a spacing ring 12 which fits into a groove 13 formed in the lower edges of the adjacent faces of such members 3 and 4, the width of the ring 12 being greater than the width of the groove formed in such members so that the adjacent faces thereof are spaced apart.

From the foregoing description it will be seen that each of the members 3 and 4 has an independent swinging movement upon the sweep 1.

Partially surrounding the male knuckle portion formed by the members 3 and 4 I furnish the members 5 and 6 forming the female knuckle portion, such members 5 and 6 together forming a portion of substantially semi-spherical form, the inner faces of which ride upon and fit the faces of the members 3 and 4. Extending from the members 5 and 6 are brackets 14 and 15 to which the ends of the inter-connecting links 2 are attached.

As the members 3 and 4 are permitted a free oscillatory movement about the sweep 1, it is only necessary to permit the female knuckle members 5 and 6 a swinging movement upon the members 3 and 4 in substantially the opposite direction. To attain this end and also to secure the members 3 and 5 and 4 and 6 together, I form the members 5 and 6 with slots 16 extending in the same direction as the sweep 1 through which screws 17 extend into the members 3 and 4. Upon reference to Figure 3, it will be apparent that the members 5 and 6 will have a limited sliding movement upon the members 3 and 4 in both directions as indicated by the arrows. As the axes X of the inter-connecting links 2 substantially extend through the centre of the sweep 1 as will be seen upon reference to Figure 2, it will be obvious that the sliding of the members 5 and 6 upon the members 3 and 4 will permit a twisting motion of such links 2 irrespective of their swinging movement in respect to the sweep.

As amusement devices in which this type of joint is incorporated, are moved from one amusement park to another, it is essential that all parts of the device permit it to be readily erected or taken down. With the joint in question, it is only necessary to lift the inter-connecting links from off the sweeps as the members 3 and 4 merely rest upon the sweeps in the form of a jaw, there being no necessity to remove such members 3 and 4 from the members 5 and 6 which are attached to the links through the medium of the brackets 14 and 15.

From the foregoing description, it will be apparent that I have devised a simple and practical form of flexible joint which is particularly adapted for use upon amusement devices of the character described and which can be readily manufactured and installed at the minimum of time and expense, and although I have shown and described a particular embodiment of my invention, it is to be understood that I can make such changes and alterations as I may deem necessary without departing from the spirit of my invention as set forth in the appended claims.

What I claim as my invention is:

1. A joint of the character described comprising a pair of independent members forming a substantially semi-spherical male knuckle portion having a slot therethrough to receive a shaft upon which such male portions oscillate, a second pair of independent members forming a female knuckle portion of substantially semi-spherical form each adapted to fit over and ride upon one of the members forming the male knuckle portion, and means for limiting the movement of the members forming the female knuckle portion to a direction substantially at right angles to the path of movement of the male knuckle member.

2. A joint of the character described comprising a pair of independent members forming a substantially semi-spherical male knuckle portion having a slot therethrough to receive a shaft upon which such male portions oscillate, a second pair of independent members forming a female knuckle portion of substantially semi-spherical form each adapted to fit over and ride upon one of the members forming the male knuckle portion and having slots therein extending substantially at right angles to the groove, and a pair of screws each extending from one of the members forming the male knuckle portion and projecting through the slots in the members forming the female knuckle portion.

ALBERT SPILLMAN.